(12) United States Patent
Learmonth

(10) Patent No.: US 11,521,450 B2
(45) Date of Patent: Dec. 6, 2022

(54) PHYSICAL ACCESS CONTROL SYSTEM AND METHOD

(71) Applicant: ASSA ABLOY AB, Stockholm (SE)

(72) Inventor: Darren Learmonth, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 17/250,971

(22) PCT Filed: Oct. 7, 2019

(86) PCT No.: PCT/EP2019/077055
§ 371 (c)(1),
(2) Date: Apr. 5, 2021

(87) PCT Pub. No.: WO2020/074430
PCT Pub. Date: Apr. 16, 2020

(65) Prior Publication Data
US 2021/0390811 A1 Dec. 16, 2021

Related U.S. Application Data

(60) Provisional application No. 62/743,222, filed on Oct. 9, 2018.

(51) Int. Cl.
*G07C 9/27* (2020.01)
*G06F 16/955* (2019.01)
(Continued)

(52) U.S. Cl.
CPC ............. *G07C 9/27* (2020.01); *G06F 16/955* (2019.01); *G07C 9/22* (2020.01); *H04L 63/0442* (2013.01); *H04L 2463/121* (2013.01)

(58) Field of Classification Search
CPC ... G07C 9/27; G07C 9/22; G07C 9/20; G07C 9/29; G07C 9/00174; G07C 9/00571; G06F 16/955; H04L 63/0442; H04L 2463/121
(Continued)

(56) References Cited

U.S. PATENT DOCUMENTS 9,591,693 B2 * 3/2017 Stroud .................. G05B 15/02
9,990,787 B2 * 6/2018 Capaldi-Tallon ..........................
G06K 19/06037

(Continued)

FOREIGN PATENT DOCUMENTS

EP        2816532 A2    12/2014
WO   WO-2014140807 A2   9/2014
(Continued)

OTHER PUBLICATIONS

"International Application Serial No. PCT/EP2019/077055, International Search Report dated Dec. 18, 2019", 4 pgs.
(Continued)

*Primary Examiner* — Nam V Nguyen
(74) *Attorney, Agent, or Firm* — Schwegman Lundberg & Woessner, P.A.

(57) ABSTRACT

An access control system and method are described. In an example, an access control system includes a tag that interacts with a mobile device and communicates door information to the mobile device. The mobile device provides at least some of the information obtained from the tag to a trusted tag server that is configured to analyze whether or not the information was obtained from a valid and trustable tag. The trusted tag server may then forward along the door information to an access control server for analysis in connection with making an access control decision for the mobile device or a holder thereof. Results of the access
(Continued)

control decision can be communicated to a mechanism that actuates and controls a protected asset that is within a predetermined proximity of the tag, thereby enabling access control without a dedicated access control reader deployed on or near the protected asset.

20 Claims, 8 Drawing Sheets

(51) Int. Cl.
*G07C 9/22* (2020.01)
*H04L 9/40* (2022.01)

(58) Field of Classification Search
USPC .................................................. 340/5.62, 5.2
See application file for complete search history.

(56) References Cited

U.S. PATENT DOCUMENTS

| | | | | |
|---|---|---|---|---|
| 10,255,732 | B2* | 4/2019 | Prasad | G07C 9/00309 |
| 10,332,325 | B2* | 6/2019 | Lee | H04L 63/0853 |
| 10,395,452 | B2* | 8/2019 | Morrison | G07C 9/20 |
| 10,404,682 | B2* | 9/2019 | Hoyer | H04L 9/3247 |
| 10,521,984 | B1* | 12/2019 | Johansson | H04L 63/108 |
| 10,826,707 | B2* | 11/2020 | Hoyer | H04L 9/14 |
| 2014/0365773 | A1* | 12/2014 | Gerhardt | H04M 1/72415 713/168 |
| 2016/0359366 | A1* | 12/2016 | Holmstroem | H04B 10/808 |
| 2016/0359629 | A1* | 12/2016 | Nadathur | H04L 9/006 |
| 2017/0017947 | A1 | 1/2017 | Robinton et al. | |
| 2017/0180539 | A1* | 6/2017 | Payack, Jr. | H04M 1/72415 |
| 2018/0262891 | A1* | 9/2018 | Wu | H04W 12/065 |

FOREIGN PATENT DOCUMENTS

| | | |
|---|---|---|
| WO | WO-2016185008 A1 | 11/2016 |
| WO | WO-2020074430 A1 | 4/2020 |

OTHER PUBLICATIONS

"International Application Serial No. PCT/EP2019/077055, Written Opinion dated Dec. 18, 2019", 6 pgs.
"European Application Serial No. 19783531.7 Response to Communication pursuant to Rules 161(1) and 162 EPC filed Oct. 18, 2021", 18 pgs.
"International Application Serial No. PCT/EP2019/077055, International Preliminary Report on Patentability dated Apr. 22, 2021", 8 pgs.

* cited by examiner

PHYSICAL ACCESS CONTROL SYSTEM AND METHOD

CROSS-REFERENCE TO RELATED APPLICATION(S)

This is a national stage application of International PCT Application Serial No. PCT/EP2019/077055, titled "Physical Access Control System and Method," filed Oct. 7, 2019, which claims priority to U.S. Provisional Application Ser. No. 62/743,222, filed Oct. 9, 2018, each of which the disclosure is incorporated herein by reference in its entirety.

FIELD OF THE DISCLOSURE

Embodiments of the present disclosure relate to authentication and, more specifically, to various systems and methods of authenticating users in various computing environments and/or access control systems.

BACKGROUND

Access control systems, especially physical access control systems, often have relatively high installation costs. In addition to the costs of the devices used to secure various access points of a property (e.g., ingress/egress doors, hallways, garage doors, gates, etc.), there is also a significant cost associated with enabling communications between all of the devices. For instance, the cost of wiring devices together in a large property can often exceed the cost of the devices themselves. Even the cost of the wire itself can be quite substantial. Most readers in an access control system require some type of communication with a centralized management system. Thus, if a dedicated set of wires are needed to support the operation of readers in the access control system, then the costs of installing or retrofitting those readers can be prohibitive.

SUMMARY

It is with respect to the above that embodiments of the present disclosure were contemplated. In particular, embodiments of the present disclosure contemplate various access control systems and methods. One non-limiting example of an access control system includes:
  a trusted tag server, comprising:
    a processor;
    a communication interface coupled with the processor and facilitating machine-to-machine communications; and
    computer memory coupled with the processor, wherein the computer memory comprises instructions that, when executed by the processor, enable the processor to:
      receive tag information and door information from a mobile device as a result of the mobile device participating in a proximity-based communication with a tag;
      analyze the tag information received from the mobile device;
      determine, based on the analysis of the tag information, that the mobile device participated in a unique interaction with the tag; and
      in response to determining that the mobile device participated in the unique interaction with the tag, transmit the door information to an access control server, wherein the door information transmitted to the access control server enables the access control server to make an access control decision for a protected asset with respect to the mobile device.

In some embodiments, a door lock that is actuated in response to commands received from the access control server, wherein the door lock controls access to the protected asset by locking or unlocking a door. Alternatively or additionally, the access control server transmits an open command directly to the door lock that causes the door lock to release the door from a secure state.

In some embodiments, the tag is positioned on or near the door and wherein the door information comprises a unique identifier assigned to the door.

In some embodiments, the instructions further enable the processor to transmit a mobile device identifier to the access control server for comparison against a set of door identifiers and permitted or non-permitted mobile devices associated with the door identifiers.

In some embodiments, the tag information comprises a tag authentication cryptogram (TAC) and a tag unique identifier (TAGID) that are appended to a resource locator. Alternatively or additionally, the resource locator comprises a web address that resolves to the trusted tag server and wherein the instructions further enable the processor to: compare the TAC with previously-received TACs to ensure that the TAC received from the mobile device is unique and not matching any previously-received TACs.

In some embodiments, the door information transmitted to the access control system is accompanied by a timestamp, wherein the timestamp is generated by a processor of the mobile device or a processor of the tag to indicate a time of the interaction between the tag and mobile device.

In another embodiment, a method is provided that comprises:
  receiving tag information and door information from a mobile device as a result of the mobile device participating in a proximity-based communication with a tag, wherein the tag is positioned on or near a protected physical asset;
  analyzing the tag information received from the mobile device;
  determining, based on the analysis of the tag information, that the mobile device participated in a unique interaction with the tag; and
  in response to determining that the mobile device participated in the unique interaction with the tag, transmitting the door information along with an identifier of the mobile device to an access control server, wherein the door information and the identifier of the mobile device transmitted to the access control server enables the access control server to make an access control decision for the protected physical asset with respect to the mobile device.

In some embodiments, the method further includes transmitting timestamp information to the access control server along with the door information and the identifier of the mobile device.

In some embodiments, the timestamp information is generated by a processor of the tag or by a processor of the mobile device.

In some embodiments, the tag information and door information received from the mobile device is encrypted and the method further comprises: decrypting one or more data packets received from the mobile device using a decryption key; extracting the tag information and the door information from the decrypted one or more data packets;

and comparing the tag information against previously-received tag information to ensure that the interaction between the tag and the mobile device corresponds to the unique interaction.

In some embodiments, the tag information and door information are appended to a web address that resolves to a web server.

In some embodiments, the tag information comprises a tag authentication cryptogram (TAC) and a tag unique identifier (TAGID) that are appended to a resource locator and wherein the door information is appended to the resource locator but separated from the TAC and TAGID with at least one delimiter.

In another embodiment, a server is provided that comprises:
 a processor;
 a communication interface coupled with the processor and facilitating machine-to-machine communications; and
 computer memory coupled with the processor, wherein the computer memory comprises a plurality of instructions sets that are executable by the processor, wherein the plurality of instruction sets comprise:
  a device authentication instruction set that is configured to perform an authentication process with a mobile device in response to the mobile device resolving a web browser to an address associated with the server;
  a trusted tag analysis instruction set that is configured to receive tag information and door information from the mobile device, analyze the tag information, and then determine whether the mobile device participated in a unique interaction with the tag, wherein the tag is positioned on or near a protected physical asset; and
  a communication instruction set that is configured to transmit the door information to an access control server in response to the trusted tag analysis instruction set determining that the mobile device participated in the unique interaction with the tag.

In some embodiments, the device authentication instruction set is configured to perform a mutual authentication with the mobile device using a web-based communication protocol.

In some embodiments, the trusted tag analysis instruction set is configured to parse a communication received from the mobile device and extract a tag authentication cryptogram (TAC) and a tag unique identifier (TAGID) that were appended to a resource locator and separated from one another with at least one delimiter.

In some embodiments, the tag is positioned on or near a protected physical asset and wherein access to the physical asset is based on the mobile device interaction with the tag.

In some embodiments, the door information comprises a door identifier as well as a timestamp generated by a processor of the tag or mobile device.

In some embodiments, the device authentication instruction set comprises a decryption key that is used to decrypt communications received from the mobile device, wherein the decryption key belongs to a key pair with an encryption key maintained by the mobile device.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Copyright and Legal Notices

A portion of the disclosure of this patent document includes material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
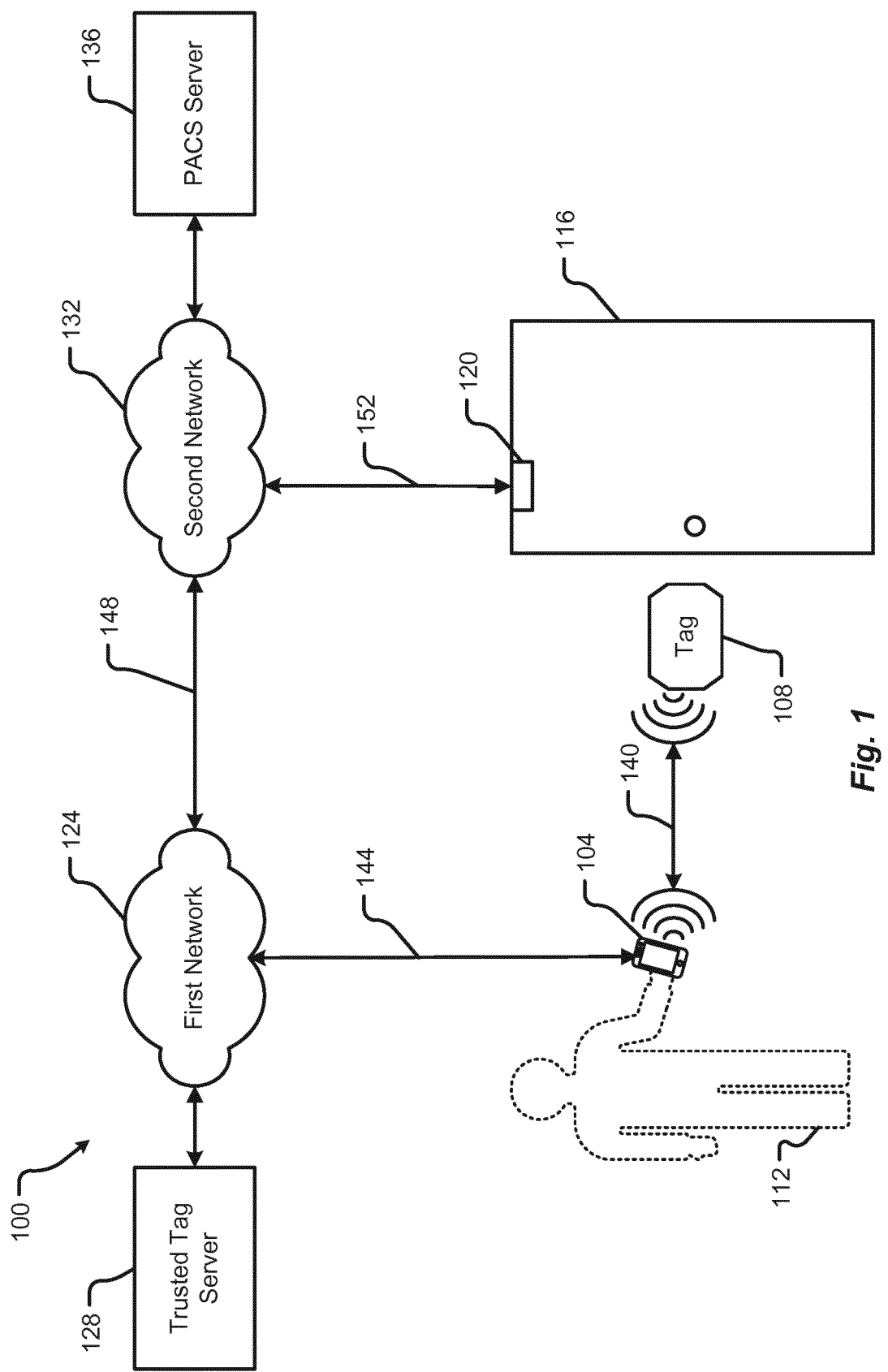
FIG. 1 is a block diagram depicting an access control system in accordance with at least some embodiments of the present disclosure.

With reference to FIG. 1, an illustrative access control system 100 will be described in accordance with at least some embodiments of the present disclosure. The system 100, in some embodiments, may correspond to a physical access control system (e.g., a system that controls access to physical assets). In some embodiments, the system 100 may correspond to a logical access control system (e.g., a system that controls access to logical assets). In some embodiments, the system 100 may correspond to a combined physical and logical access control system.

The illustrative system 100 is shown to include a user 112 that carries a mobile device 104 and uses the mobile device to interact with a tag 108 placed on or near a protected asset (e.g., a door 116, hallway, computer, gate, etc.). As will be discussed in further detail herein, the door 116 (or other asset) may have access thereto protected without use of a traditional access control reader. In some embodiments, the tag 108 is fixedly attached on or near the protected asset and is encoded with information describing the protected asset. For example, the tag 108 may have an identification number or door ID written into memory of the tag 108. The door ID written to the tag 108 may be used as a mechanism for communicating door information throughout the system 100 and for enabling the user 112 to gain access through the door 116.

The mobile device 104 may correspond to any type of computing device that is portable in nature. While depicted as a mobile communication device 104, such as a cellular phone, smart phone, or the like, it should be appreciated that the mobile device 104 may correspond to any type of device that is configured to be carried by the user 112, presented to the tag 108, and is capable of communicating with a communication network 124. Thus, the mobile device 104 may be provided as a tablet, PDA, wearable device, portable credential card, key fob, or the like.

Functionality of the system 100 may be facilitated by operation of a trusted tag server 128 and access control server 136. The servers 128, 136 may cooperate with one another to obtain door information from the mobile device 104 and then make an access control decision for the user 112 that is holding the mobile device 104. In some embodiments, the servers 128, 136 may be provided as separate servers that are physically separated from one another by multiple communication networks 124, 132 and, possibly, one or more firewalls. In some embodiments, functionality of the servers 128, 132 may be contained within a single server device or within different blades of a single server, in which case the servers 128, 132 may not be separated from one another by communication networks 124, 132.

The trusted tag server 128 may be provided with functionality that enables communication with the mobile device 104 and with functionality that enables analysis of tag information communicated to the mobile device 104 from the tag 108. In some embodiments, the trusted tag server 128 may be configured to receive and analyze tag information received from the mobile device 104 prior to sending door information (which may have been encapsulated with the tag information) along to the access control server 136.

The access control server 136 may be provided with functionality that enables access control decisions to be made within the access control system 100. For instance, the access control server 136 may be configured to analyze door information received from the trusted tag server 128 and to make an access control decision based thereon. In some embodiments, the access control server 136 may correspond to a physical access control system (PACS) server 136 that is configured to communicate with various door locks 120 or mechanical components that secure a door 116. The door locks 120 may correspond to physical lock devices, bolt devices, magnetic lock devices, or the like. The door locks 120 may be configured to respond to simple commands issued by the PACS sever 136. For instance, if the PACS server 136 determines that a user 112 is allowed access through the door 116 based on information communicated to the PACS server 136 from the trusted tag server 128, then the PACS server 136 may send one or more commands to the door lock 120 that cause the door lock to actuate and move to an unlocked position. In some embodiments, the door lock 120 may also be configured to actuate the door (e.g., to automatically open, close, or otherwise cause the door 120 to move between an open or closed state).

The communication networks 124, 132 may correspond to any known type of network that facilitates machine-to-machine communications. The networks 124, 132 may use the same communication protocols or different protocols without departing from the scope of the present disclosure. In some embodiments, the devices 104, 128, 136 connected with the networks 124, 132 may be configured to communicate using various nodes or components of the communication networks 124, 132. Each communication network 124, 132 may comprise any number of communication networks, and may also comprise any type of known communication medium or collection of communication media and may use any type of protocols to transport messages between endpoints. One or both networks 124, 132 may include wired and/or wireless communication technologies. The Internet is an example of a communication network that constitutes an Internet Protocol (IP) network consisting of many computers, computing networks, and other communication devices located all over the world, which are connected through many telephone systems and other means. Other examples of a communication network include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication networks 124, 132 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof. Although the communication network 104 is depicted as a single network, it should be appreciated that the communication network 104 may include a plurality of different networks and/or network types without departing from the scope of the present disclosure.

The servers 128, 136 or components thereof may be provided as a single server, multiple servers or in a cloud-computing environment. In any scenario, the functions of a server 128, 136 may be contained within a single server housing or may be distributed among a plurality of different servers.

As shown in FIG. 1, a proximity-based communication link 140 may be established between the mobile device 104 and tag 108. The proximity-based communication link 140 may be used to enable authentication between the mobile device 104 and tag 108, exchange data between the mobile device 103 and tag 108, and the like. The type of protocol used for the proximity-based communication link 140 may be selected to ensure that the mobile device 104 is within a predetermined distance of the tag 108 and, therefore, also within a predetermined distance of the door 116. Upon establishing the communication link 140, the assumption can be made that the user 112 is attempting access through the door 116. Thus, establishment of the communication link 140 may cause the mobile device 104 and tag 108 to automatically begin an authentication process and, if such authentication is successful, enable the mobile device 104 to obtain tag information and/or door information from the tag 108. Non-limiting examples of protocols that can be used to establish or maintain the communication link 140 include NFC, Bluetooth, WiFi, Infrared, or any other wireless communication protocol that has a fixed communication range of no more than 50 meters and possibly no more than 5 meters.

The mobile device 104 may then be configured to communicate with the trusted tag server 128 via a first network link 144. In some embodiments, the network link 144 may utilize cellular communication protocols, WLAN communication protocols, or the like. Examples of such protocols include, without limitation, IEEE WiFi standard protocols (e.g., 802.11a thru 802.11x), cellular communication protocols (e.g., GSM, GPRS, CDMA, 4G, 5G, 6G, UMTS, EDGE, etc.), ZigBee, or the like.

Communications between servers 128, 136 may be facilitated by an IP-based communication link 148. The communication link 148 may utilize any type of packet-based communications protocol to facilitate communications between the servers. In some embodiments, the communication link 148 utilizes an IP protocol such as HTTP, HTTPS, etc. In some embodiments, the communication link 148 may further utilize a tunneling protocol to facilitate secure communications over an otherwise unsecured communication network (e.g., the first communication network 124 and/or second communication network 132).

Communications between the access control server 136 and the mechanical security components of the system 100 (e.g., the door locks 120) may be facilitated by a security control link 152. The security control link 152 may utilize an IP-based communication protocol (e.g., HTTP, HTTPS, etc.). Alternatively or additionally, the security control link 152 may utilize other types of communication protocols such as RS-232, RS-485, Ethernet, ZigBee, or the like. As can be seen in FIG. 1, the ultimate communication flow from the tag 108 to the door lock 120 may traverse a number of different communication links and may use different communication protocols, although such a configuration is not required.

Figure 2:
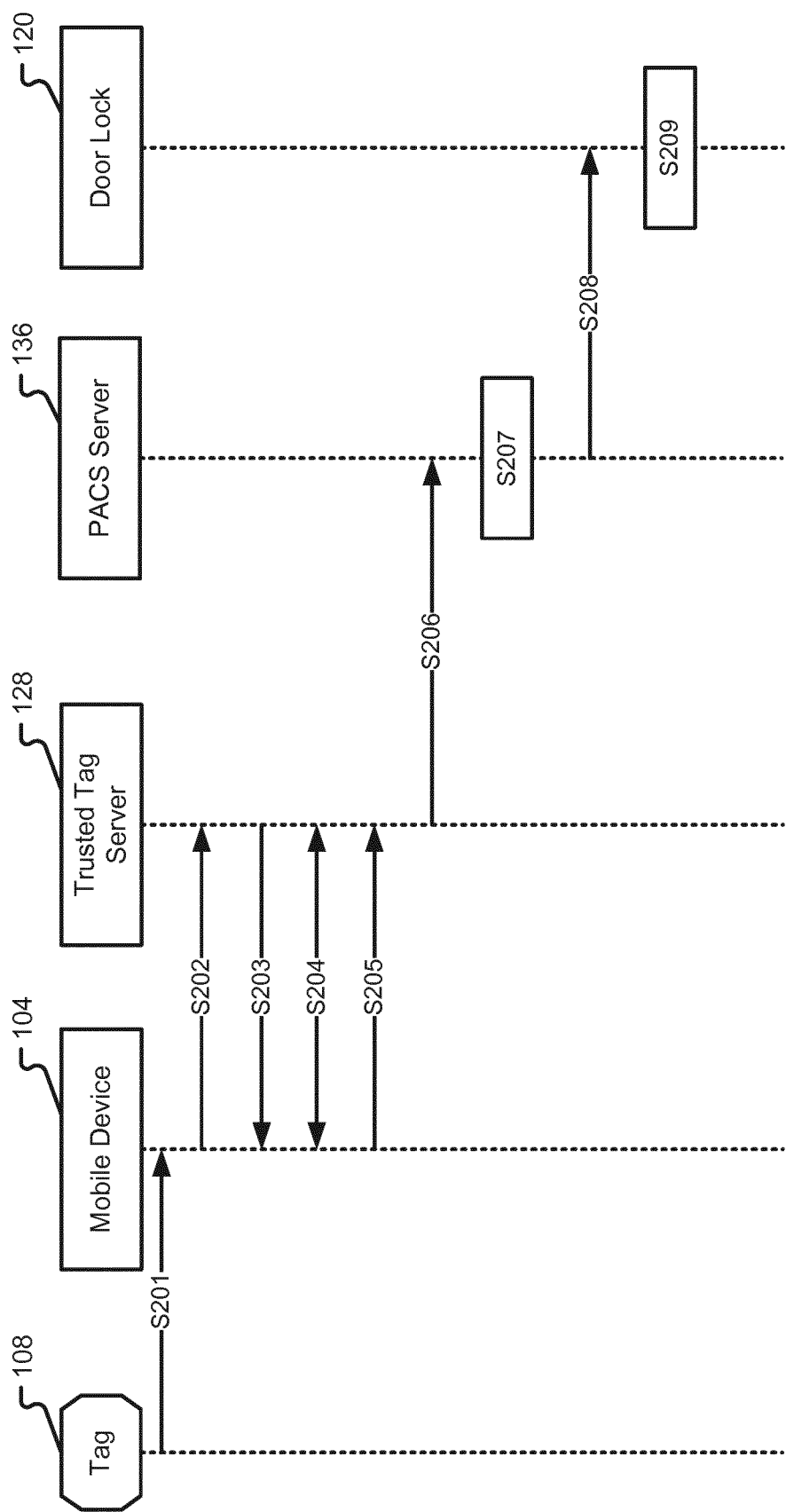
FIG. 2 is a flow diagram depicting an access control method in accordance with at least some embodiments of the present disclosure.
Figure 3:
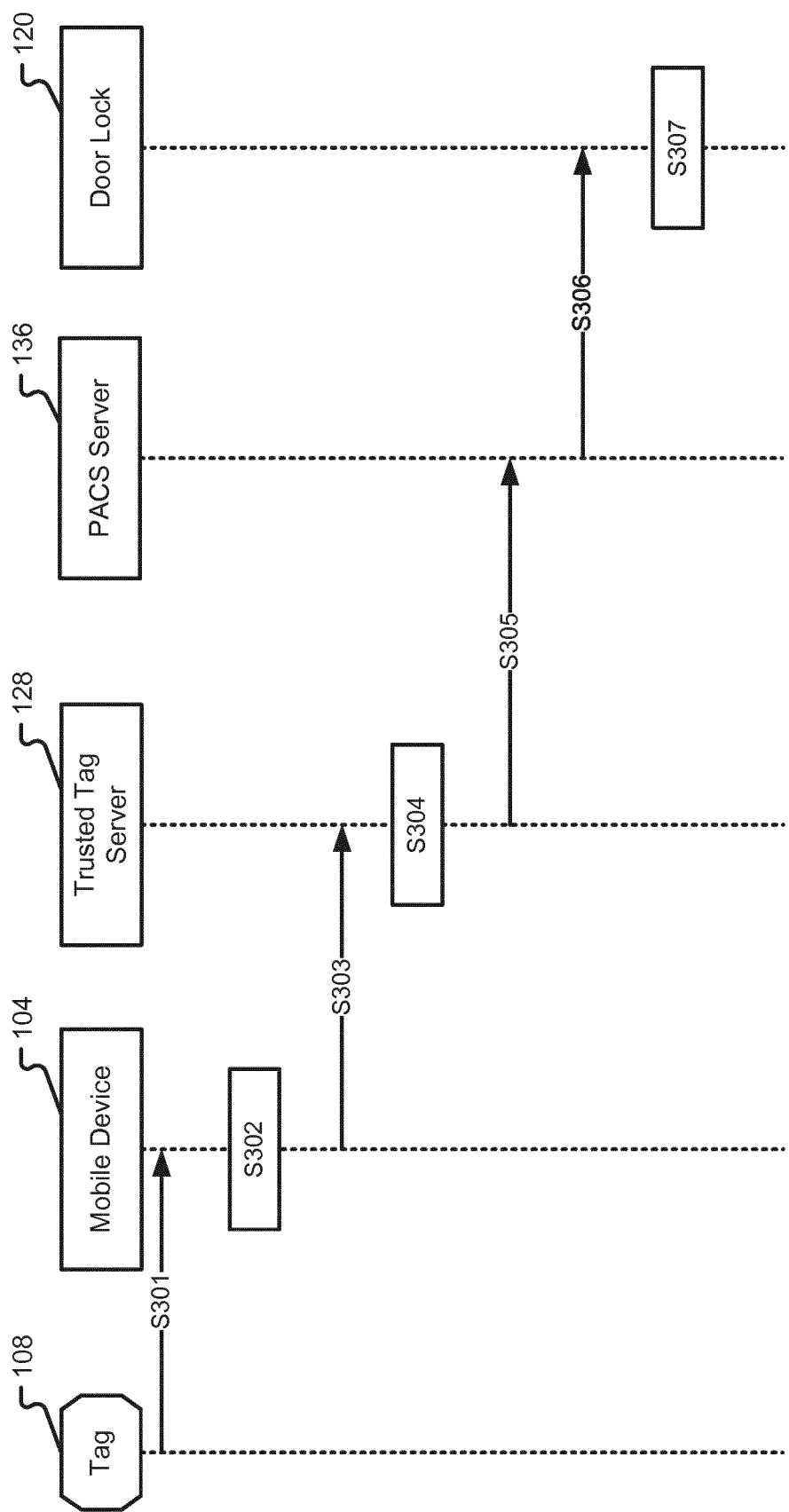
FIG. 3 is a flow diagram depicting another access control method in accordance with at least some embodiments of the present disclosure.

With reference now to FIGS. 2 and 3, various details of the operation of the system 100 will be described in accordance with at least some embodiments of the present disclosure. While the various process steps will be described as a sequence of events, it should be appreciated that any number of these process steps may be performed in parallel with one another or in a different order than depicted.

Referring initially to FIG. 2, a first access control method will be described in accordance with at least some embodiments of the present disclosure. The method begins with the tag 108 and mobile device 104 initiating a first interaction (step S201). The first interaction may begin when the mobile device 104 is brought within a predetermined distance (e.g., a read range) of the tag 108. Depending upon the communication protocol used between the devices, the interaction may include a pairing process (e.g., for Bluetooth or BLE communications) or an inductive coupling process (e.g., for NFC). During the interaction the tag 108 may be configured to provide a payload of data to the mobile device 104. In some embodiments, the payload of data provided to the mobile device 104 may include tag information and/or door information. As will be discussed in further detail herein and as discussed in U.S. Pat. No. 9,860,236, the entire contents of which are hereby incorporated herein by reference, the payload of data may be transmitted to the mobile device 104 in the form of a Universal Resource Locator (URL) or the like.

Tag information and/or door information may be appended to or included in the URL. Examples of tag information that may be provided in the payload of data include, without limitation, a Unique Identifier (UID) assigned to the tag 108, a location of the tag 108, a timestamp generated by a processor of the tag 108, a Tag Authentication Cryptogram (TAC), etc. The URL may also include an address, such as a web address or URL, that points toward the trusted tag server 128.

The door information that may be included in the payload of data may include, without limitation, a door ID, a door name or description, permissions associated with the door 116, and combinations thereof. The door information may be included in the URL, but may be delimited from the tag information by one or more delimiters (e.g., a predetermined punctuation or symbol). The delimiters may enable the mobile device 104 to parse and separate the door information from the tag information for subsequent processing.

When the mobile device 104 receives the payload of data from the tag 108, the method may continue with the mobile device 104 initiating a second interaction with the trusted tag server 128. In some embodiments, the second interaction is initiated with the mobile device 104 directing a browser application or the like toward a predetermined web address that was contained within the payload of data received from the tag 108. In some embodiments, the mobile device 104 may issue a first request to the trusted tag server 128 to begin a web-based communication session (step S202). The web-based communication session may correspond to a synchronous or asynchronous communication session without departing from the scope of the present disclosure. In some embodiments, the communication provided to the trusted tag server 128 may include an HTTP or HTTP GET request. The trusted tag server 128 may respond to the mobile device 104 by issuing a "who" request (step S203), which causes the trusted tag server 128 and mobile device 104 to enter into an authentication processes whereby the trusted tag server 128 is allowed to authenticate with the mobile device 104 and the mobile device 104 is allowed to authenticate with the trusted tag server 128 (step S204). The mutual authentication process may be performed using a SEOS authentication process, an OAUTH authentication process, or any other known web-based authentication process. The purpose of authentication is to establish a level of trust between the mobile device 104 and the trusted tag server 128 before the method is allowed to continue. In the absence of the established trust, the mobile device 104 and/or trusted tag server 128 may refrain from transmitting sensitive data to one another in connection with the access control method.

If the authentication process of step S204 is completed successfully, then the method may continue with the mobile device 104 transmitting door information and, optionally, at least some tag information to the trusted tag server 128 (step S205). In some embodiments, the mobile device 104 may further include a timestamp generated by a processor of the mobile device 104. In some embodiments, the mobile device 104 may include the timestamp received from the tag 108. In some embodiments, the mobile device 104 may also provide some information identifying the mobile device 104 or the user 112 thereof. This mobile device 104 information may include an identifier of the mobile device 104 or an identifier of credential data stored within the mobile device 104.

The trusted tag server 128 may react by transmitting the entirety of data received from the mobile device 104 to the access control server 136 (step S206). In some embodiments, the trusted tag server 128 may transmit the door information to the access control server 136. The trusted tag server 128 may also be configured to transmit timestamp information to the access control server 136 along with the door information. The timestamp information transmitted by the trusted tag server 128 may correspond to timestamp information received from the mobile device 104, which may have been generated by a processor of the mobile device 104 and/or a processor of the tag 108.

The access control server 136 continues by analyzing the information received from the trusted tag server (step S207). In some embodiments, this particular step may include the access control server applying security rules or the like to the information received from the trusted tag server 128. More specifically, the access control server 136 may be configured to compare the door information received from the trusted tag server 128 with a set of access rules or a listing of door IDs and determining if the mobile device 104 that communicated with the tag 108 is allowed access to the door 116 identified by the door ID. Thus, the access control server 136 may be configured to determine whether or not the mobile device 104 is allowed access to the door 116. The application of the access control rules may also include whether the mobile device 104 is allowed to access the door 116 at the time indicated by the timestamp(s). For instance, there may be periods of time during which the mobile device 104 is not allowed access through the door 116 whereas other periods of time exist where the mobile device 104 is allowed access through the door 116. Such information may be recorded or made available to the access control server 136 to facilitate the decision made in step S207.

If the access control server 136 determines that the mobile device 104 is allowed access through the door 116, then the access control server 136 may transmit an unlock message or command to the door lock 120 (step S208). Upon receiving the command from the access control server 120, the door lock 120 may actuate and unlock/open the door 116, thereby permitting the user 112 access to the door 116 (step S209). In some embodiments, the door lock 120 may be connected with a controller, control panel, or the like that is positioned on a secure side of the door 116. The controller or control panel may operate as the logic and interface between the door lock 120 and the access control server 136 and the controller or control panel may actually instruct the door lock 120 to actuate in accordance with the instructions received in step S208.

Referring now to FIG. 3, an alternative access control method will be described in accordance with at least some embodiments of the present disclosure. The method is similar to the method depicted and described in FIG. 2, in that the method is initiated when the tag 108 and mobile device 104 interact with one another (step S301) and the tag 108 provides a payload of data to the mobile device 104. The payload of data, in this particular embodiment, may correspond to a similar or identical payload of data as transmitted in step S201. For instance, the mobile device 104 may receive a first URL from the tag 108 and the first URL may include tag information and/or door information.

The method continues with the mobile device 104 processing at least some of the data from the first URL to generate a second URL (step S302). In some embodiments, the second URL may include some or all of the information from the first URL, but may also further include a mobile device ID. Alternatively or additionally, the mobile device 104 protect or encrypt some or all of the information from the first URL with an encryption key. Once encrypted or otherwise formatted into the second URL (e.g., a secure URL), the mobile device 104 may simply transmit the second URL to the trusted tag server 128 (step S304).

The trusted tag server 128 may be configured to decrypt the second URL or otherwise extract relevant information from the second URL (step S304). In some embodiments, the trusted tag server 128 may be configured to decrypt the second URL and extract the tag UID, TAC, and/or other information from the second URL. The trusted tag server 128 may be configured to analyze the TAC to ensure that the information received from the mobile device 104 is not received as part of a replay attack, but rather corresponds to a genuine and unique interaction between the mobile device 104 and tag 108. The trusted tag server 128 may also analyze the tag UID to ensure that the tag 108 is valid and trusted. If the trusted tag server 128 verifies that the tag 108 is valid and that the interaction between the mobile device 104 and tag 108 is unique, then the trusted tag server 128 may forward some or all of the tag information and/or door information along to the access control server 136 (step S305). In some embodiments, the trusted tag server 128 may also forward along any mobile device 104 information received from the mobile device 104.

Because the trusted tag server 128 was able to successfully decrypt the second URL and extract information therefrom, it can be assumed that the mobile device 104 is trusted because the second URL was encrypted with a valid key to which the trusted tag server 128 had a counterpart decryption key. That is, success with decrypting or parsing the second URL at the trusted tag server 128 may provide an indication that the mobile device 104 is trusted and should at least be given the opportunity to have information sent along to the access control server 136 for further analysis.

As with the method of FIG. 2, the access control server 136 may perform an analysis of the mobile device information, tag information, and/or door information to determine if the mobile device 104 is permitted access to the door 116. If such access is deemed allowable, then the access control server 136 may transmit a control command to the door lock 120 (step S306) causing the door lock 120 to actuate and open the door 116 (step S307). In some embodiments, the access control server 136 may not be required to make an access control decision. Rather, the information received from the trusted tag server 128 may be forwarded along to the door lock or a controller thereof where an access control decision is made.

Figure 4:
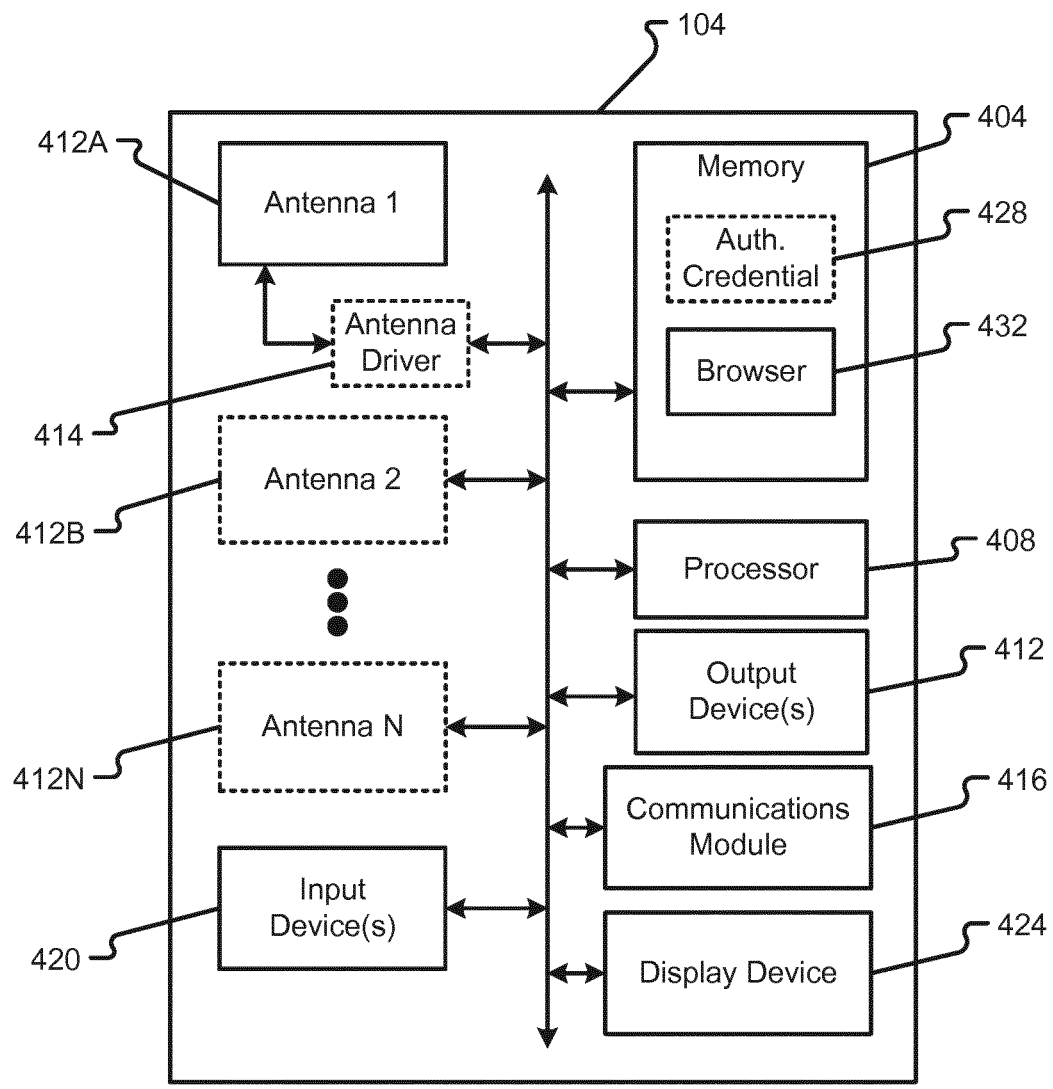
FIG. 4 is a block diagram depicting a mobile device in accordance with at least some embodiments of the present disclosure.

With reference now to FIG. 4, additional details of a mobile device 104 will be described in accordance with at least some embodiments of the present disclosure. The mobile device 104 may include one or more components, such as, a memory 404, a processor 408, an antenna 412A-N, a communications module 416, one or more input devices 420, and one or more display devices 424. In some embodiments, the mobile device 104 may further include a power module.

The memory 404 of the mobile device 104 may be used in connection with the execution of application programming or instructions by the processor 408, and for the temporary or long-term storage of program instructions and/or data. The memory 404 may contain executable functions that are used by the processor 408 to run other components of the mobile device 104. In one embodiment, the memory 404 may be configured to store credential information, such as authentication credentials 428 and a browser application 432.

The authentication credential 428 may include, but is not limited to, unique identifications, manufacturer identification, passwords, keys, encryption schemes, transmission protocols, and the like. As a non-limiting example, the authentication credential may correspond to a SEOS credential that is configured to perform an authentication process with the trusted tag server 128. In some embodiments, the memory 404 may be configured to store configuration information, identification information, authentication information, and/or the like.

The browser application 432 may correspond to any type of known application that enables communications with a server over the World Wide Web. As a non-limiting example, the browser application 432 may be provided as a mobile-based browser application. For instance, the browser application 432 may include Safari, Firefox, Chrome, Microsoft Edge, Opera, Vivaldi, or the like.

In some embodiments, the memory 404 may comprise volatile or non-volatile memory and a controller for the same. Non-limiting examples of memory 404 that may be utilized in the mobile device 104 include RAM, ROM, buffer memory, flash memory, solid-state memory, or variants thereof.

The processor 408 may correspond to one or many microprocessors that are contained within the housing of the mobile device 104 with the memory 404. In some embodiments, the processor 408 incorporates the functions of the user device's Central Processing Unit (CPU) on a single Integrated Circuit (IC) or a few IC chips. The processor 408 may be a multipurpose, programmable device that accepts digital data as input, processes the digital data according to instructions stored in its internal memory, and provides results as output. The processor 408 implements sequential digital logic as it has internal memory. As with most known microprocessors, the processor 408 may operate on numbers and symbols represented in the binary numeral system.

The one or more antennas 412A-N may be configured to enable wireless communications between the mobile device 104 and a reading device 112, a wearable device, and/or some other device. As can be appreciated, the antenna(s) 412A-N may be arranged to operate using one or more wireless communication protocols and operating frequencies including, but not limited to, Bluetooth®, BLE, NFC, ZigBee, GSM, CDMA, WiFi, RF, and the like. By way of example, the antenna(s) 412A-N may be RF antenna(s), and as such, may transmit RF signals through free-space to be received by a reading device 112 having an RF transceiver.

One or more of the antennas 412A may be driven or operated by a dedicated antenna driver 414.

In some embodiments, the mobile device 104 may include a power module. The power module may be configured to provide power to the parts of the mobile device 104 in order to operate. The power module may store power in a capacitor of the power module. In one embodiment, electronics in the power module may store energy in the capacitor and turn off when an RF field is present. This arrangement can ensure that energy is presented to the mobile device 104 minimizing any effect on read distance. For example, the power module may include a battery or other power source to supply power to parts of the mobile device 104. The power module may include a built-in power supply (e.g., battery) and/or a power converter that facilitates the conversion of externally-supplied AC power into DC power that is used to power the various components of the mobile device 104. In some embodiments, the power module may also include some implementation of surge protection circuitry to protect the components of the mobile device 104 from power surges.

The mobile device 104 may include a communications module 416 that is configured to communicate with one or more different systems or devices either remote or local to the mobile device 104. Thus, the communications module 416 can send or receive messages to or from servers, tags, wearable devices, other mobile devices 104, etc.

The input device(s) 420 may include at least one device sensor. Among other things, a device sensor may be configured to detect a state of the mobile device 104 or location of the mobile device 104 or the number of steps taken by the wearer of the device, and, therefore, a state or pace/path of the user 102 holding the mobile device 104. Illustrative but non-limiting sensors include one or more biometric sensors (e.g., heart rate, body temperature and/or heat signature, blood pressure, etc.), capacitive sensors, light sensors, image sensors, temperature sensors, pressure sensors, contact sensors, magnetic sensors, radio indoor positioning sensors, location services sensors and/or devices, combinations thereof, and the like. As can be appreciated, one or more of these sensors may alternatively or additionally be incorporated into a wearable device. Yet another type of suitable sensor that can be included in the input device(s) 420 is a location sensor. A location sensor may be configured to determine a geographical location and/or position of the mobile device 104 and/or a position of the mobile device 104 relative to a tag 108 or a door 116. In one embodiment, this location may be based on Global Positioning System (GPS) data provided by a GPS module of the mobile device 104. In some embodiments, the location of the mobile device 104 may be provided based on cell tower data, WiFi information, iBeacon information, and/or some other location information provided by a location module and/or a communications module 416 of the mobile device 104. In one embodiment, the authentication of a user may be based at least partially on determining a location of the mobile device 104. Thus, the location information may be provided to the trusted tag server 128 along with door information and/or tag information. In some embodiments, one or more features of the mobile device 104 may be controlled based on a location and/or state of the mobile device 104.

In some embodiments, the mobile device 104 may include a user interface, a tag interface, and/or a network interface. The user interface may or may not include one or more input devices 420 and/or display devices 424. Examples of suitable user input devices that may be included in the user interface include, without limitation, buttons, keyboards, mouse, touch-sensitive surfaces, pen, camera, microphone, etc. Examples of suitable user output devices that may be included in the user interface include, without limitation, display screens, touchscreens, lights, speakers, etc. It should be appreciated that the user interface may also include a combined user input and user output device, such as a touch-sensitive display or the like.

The tag interface may correspond to the hardware that facilitates communications with the tag 108 for the mobile device 104. The tag interface may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the tag interface is specifically provided to facilitate proximity-based communications over link 140 with a tag 108.

The network interface may comprise hardware that facilitates communications with other communication devices over the communication network 104. The network interface may include an Ethernet port, a Wi-Fi card, a Network Interface Card (NIC), a cellular interface (e.g., antenna, filters, and associated circuitry), or the like. The network interface may be configured to facilitate a connection between the mobile device 104 and the communication network 104 and may further be configured to encode and decode communications (e.g., packets) according to a protocol utilized by the communication network 104.

If NFC is being used for the communication channel, then the tag 108 and mobile device 104 may have their interfaces/antennas inductively coupled to one another at which point the tag and/or mobile device 104 will authenticate or mutually authenticate with one another. Following authentication, the tag 108 may request a key or multiple keys from the mobile device 104, or the mobile device 104 may offer a key or multiple keys to the reader 112.

If, for instance, BLE or some other non-inductive protocol (e.g., WiFi) is being used for the communication link 140, then the tag 108 and mobile device 104 may perform a discovery routine prior to pairing with one another or otherwise connecting to establish the communication channel 140. After the channel is established, however, the tag 108 and mobile device 104 may then authenticate one another and exchange relevant information, such as the payload of data, to enable the mobile device 104 to appropriately interact with the trusted tag server 128.

Figure 5:
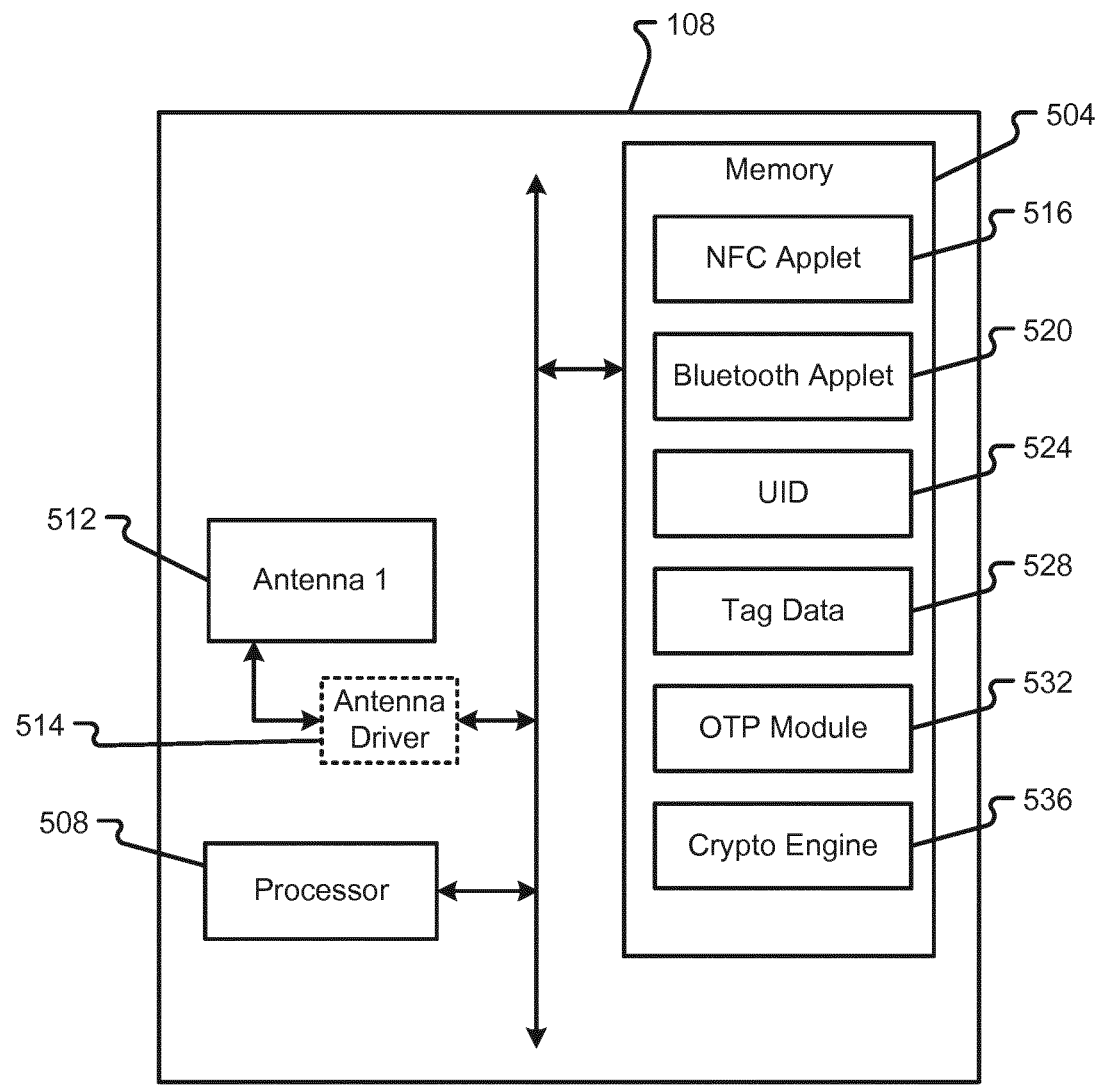
FIG. 5 is a block diagram depicting a tag in accordance with at least some embodiments of the present disclosure.

With reference now to FIG. 5, additional details of a tag 108 will be described in accordance with at least some embodiments of the present disclosure. The tag 108 is shown to include memory 504, a processor 508, an antenna 512, and an optional driver 514 for the antenna 512. In some embodiments, the memory 504 the data storage 112 may correspond to volatile or non-volatile memory. Even more specifically, memory 504 may correspond to a secure memory location of an Integrated Circuit (IC). In such an embodiment, the tag 108 may correspond to an Integrated Circuit Card (ICC).

In some embodiments, the processor 508 may correspond to a plurality of processors, each configured to perform certain operations for the tag 108. The processor 508 may correspond to a microprocessor, Central Processing Unit (CPU), collection of processors or CPUs, or the like. In some embodiments, the processor 508 may be configured to execute instructions stored in memory 504, thereby providing functionality to the tag 108.

The memory 504 may comprise a number of modules or instruction sets (e.g., applications, drivers, etc.) stored therein. Data may also be stored in memory 504. In some embodiments, the memory 504 may include volatile and/or non-volatile memory. As some non-limiting examples, the memory 504 may include an NFC applet 516, a Bluetooth or BLE applet 520, a One-Time Password (OTP) module 532, and a cryptographic engine 536. The memory 504 may also store a UID 524, other tag data 528, and any other tag information that may be included in a payload of data transmitted to a mobile device 104.

The NFC applet 516 may comprise instructions that, when executed by the processor 508, enable the NFC functionality of the tag 108. For instance, the NFC applet 516 may be responsible for causing the tag 108 to operate in a card emulation mode, a read/write mode, and/or a peer-to-peer mode. The NFC applet 516 may also correspond to a specific portion of memory where sensitive data normally communicated via NFC (e.g., key(s), encryption algorithms, PINs, credit card numbers, payment authorization information, other transaction data, etc.) is securely stored on the tag 108. Alternatively or additionally, the NFC applet 516 may be replaced with or supplemented with a Bluetooth applet 520 that enables the tag 108 to communicate with other devices (e.g., the mobile device 104) via Bluetooth. It should be appreciated that the tag 108 may be equipped for both Bluetooth and NFC communications. In some embodiments, the Bluetooth communications and/or NFC communications may occur via the antenna 512.

When executed, the NFC applet 516 or Bluetooth applet 520 may cause the processor 508 to exchange information with other devices according to known NFC or Bluetooth protocols via the antenna 512. Where NFC is employed, the NFC applet 516 may utilize the antenna 512 as a coil or antenna that inductively couples with other RF-enabled devices.

The UID 524 may correspond to a unique identifier assigned to the tag. The tag data 528, as compared to the UID 524, may include additional information written specifically to the tag 108. In some embodiments, the tag data 528 may include a URL, other tag information, and/or door information for the door 116 with which the tag 108 is associated. The OTP module 532 may be configured to generate OTPs or codes that are unique to each interaction with a mobile device 104. The cryptographic engine 536 may be leveraged by the OTP module 532 in connection with generating OTPs or codes that are unique to an interaction with a mobile device 104. In some embodiments, the OTP module 532 may be configured to generate a TAC or the like and append the TAC to a TAGID within a URL, which is eventually transmitted to a mobile device 104. In this way, the data transmitted to a mobile device 104 is unique from one read interaction to the next. This information can be provided to the trusted tag server 128 by the mobile device 104 to facilitate the determination of unique tag read events. In some embodiments, the trusted tag server 128 may condition the transmission of data to the access control server 136 upon determining that a mobile device 104 has uniquely interacted with a tag 108 as determined by analyzing the TAC and/or TAGID.

Figure 6:
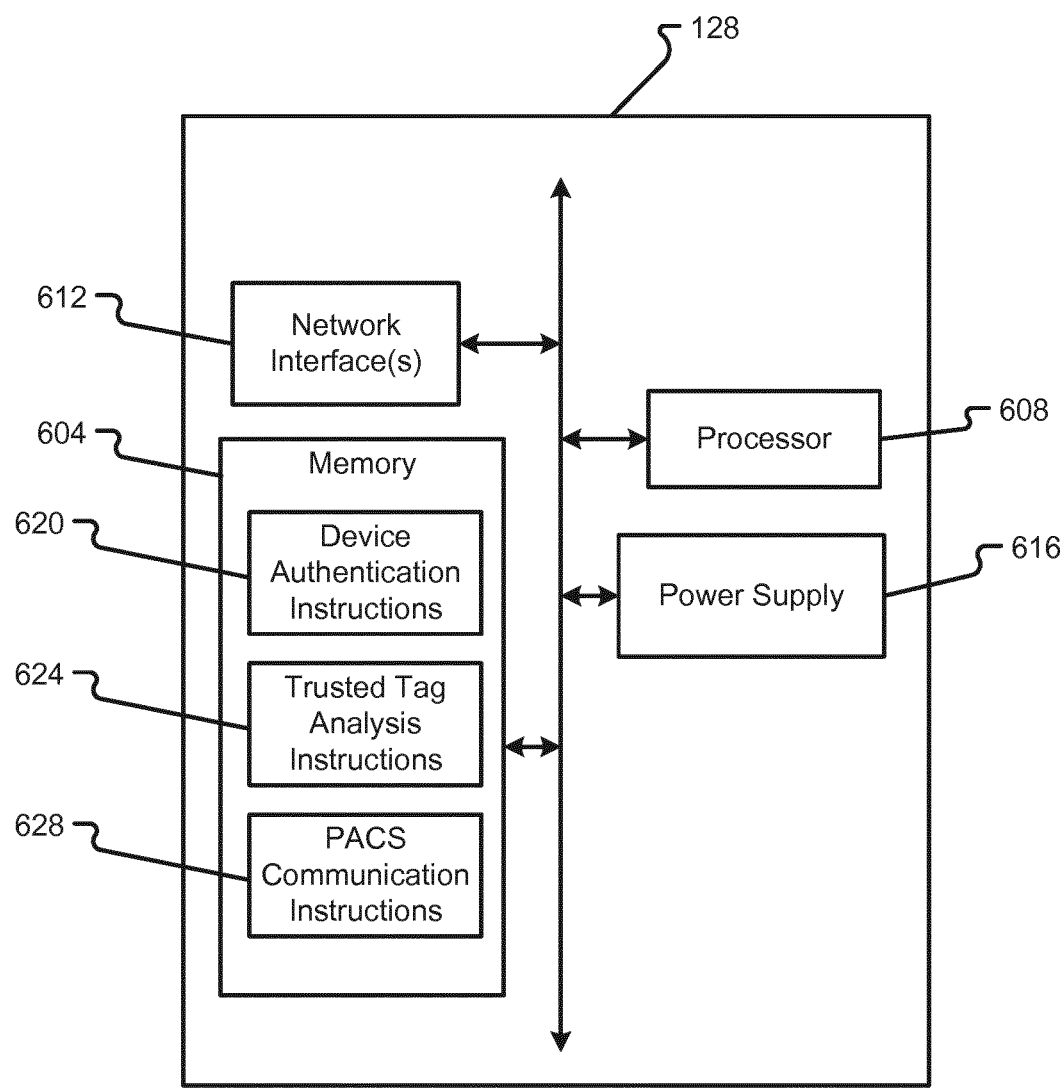
FIG. 6 is a block diagram depicting a trusted tag server in accordance with at least some embodiments of the present disclosure.

With reference now to FIG. 6, additional details of a trusted tag server 128 will be described in accordance with at least some embodiments of the present disclosure. The trusted tag server 128 is shown to include a processor 608 and memory 604 in addition to a network interface 612. These resources may enable functionality of the trusted tag server 128 as will be described herein. For instance, the network interface 612 provides the server 128 with the ability to send and receive communication packets over the communication network 124. The network interface 612 may be provided as a network interface card (NIC), a network port, drivers for the same, and the like. Communications between the components of the server 128 and other devices connected to the communication network 124 may all flow through the network interface 612.

The processor 608 may correspond to one or many computer processing devices. For instance, the processor 608 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 608 may be provided as a microprocessor, Central Processing Unit (CPU), or plurality of microprocessors or CPUs that are configured to execute the instructions sets stored in memory 604. Upon executing the instruction sets stored in memory 604, the processor 608 enables tag analysis functions.

The memory 604 may include any type of computer memory device or collection of computer memory devices. Non-limiting examples of memory 604 include Random Access Memory (RAM), Read Only Memory (ROM), flash memory, Electronically-Erasable Programmable ROM (EEPROM), Dynamic RAM (DRAM), etc. The memory 604 may be configured to store the instruction sets depicted in addition to temporarily storing data for the processor 608 to execute various types of routines or functions. Illustrative instruction sets that may be stored in memory 604 include, without limitation, a device authentication instruction set 620, a trusted tag analysis instruction set 624, and an access control server communication instruction set 628. Functions of the server 128 enabled by these various instruction sets will be described in further detail herein. It should be appreciated that the instruction sets depicted in FIG. 6 may be combined (partially or completely) with other instruction sets or may be further separated into additional and different instruction sets, depending upon configuration preferences for the server 128. Said another way, the particular instruction sets depicted in FIG. 6 should not be construed as limiting embodiments described herein.

The device authentication instruction set 620 may, when executed by the processor 608, enable the trusted tag server 128 to authenticate with a mobile device 104 and establish a communication session with a mobile device 104. In some embodiments, the device authentication instruction set 620 may enable mutual authentications with mobile devices 104 using various types of authentication protocols. The device authentication instruction set 620 may alternatively or additionally include one or more decryption keys that are used to decrypt messages or data received from a mobile device 104.

The trusted tag analysis instruction set 624, when executed by the processor 608, may enable the trusted tag server 128 to analyze tag information received from the mobile device 104. In some embodiments, the trusted tag analysis instruction set 624 may include a number of routines that enable the trusted tag server 128 to determine that a mobile device 104 is providing valid tag information and that the tag information was received at the mobile device 104 during a unique interaction with a tag 108. For instance, the trusted tag analysis instruction set 624 may be configured to analyze a TAC and/or TAGID received from the mobile device 104 and may further enable a resolution of instructions contained in a URL received from the mobile device 104.

The communication instructions 628, when executed by the processor 608, may enable the trusted tag server 128 to communicate with the access control server 136. For instance, the communication instructions 628 may be configured to generate messages that are transmittable over the communication networks 124 and/or 132 for receipt by the access control server 136. In some embodiments, the communication instructions 628 may also enable the server 128 to perform other types of web-based communications such as HTTP or HTTPS functions.

Figure 7:
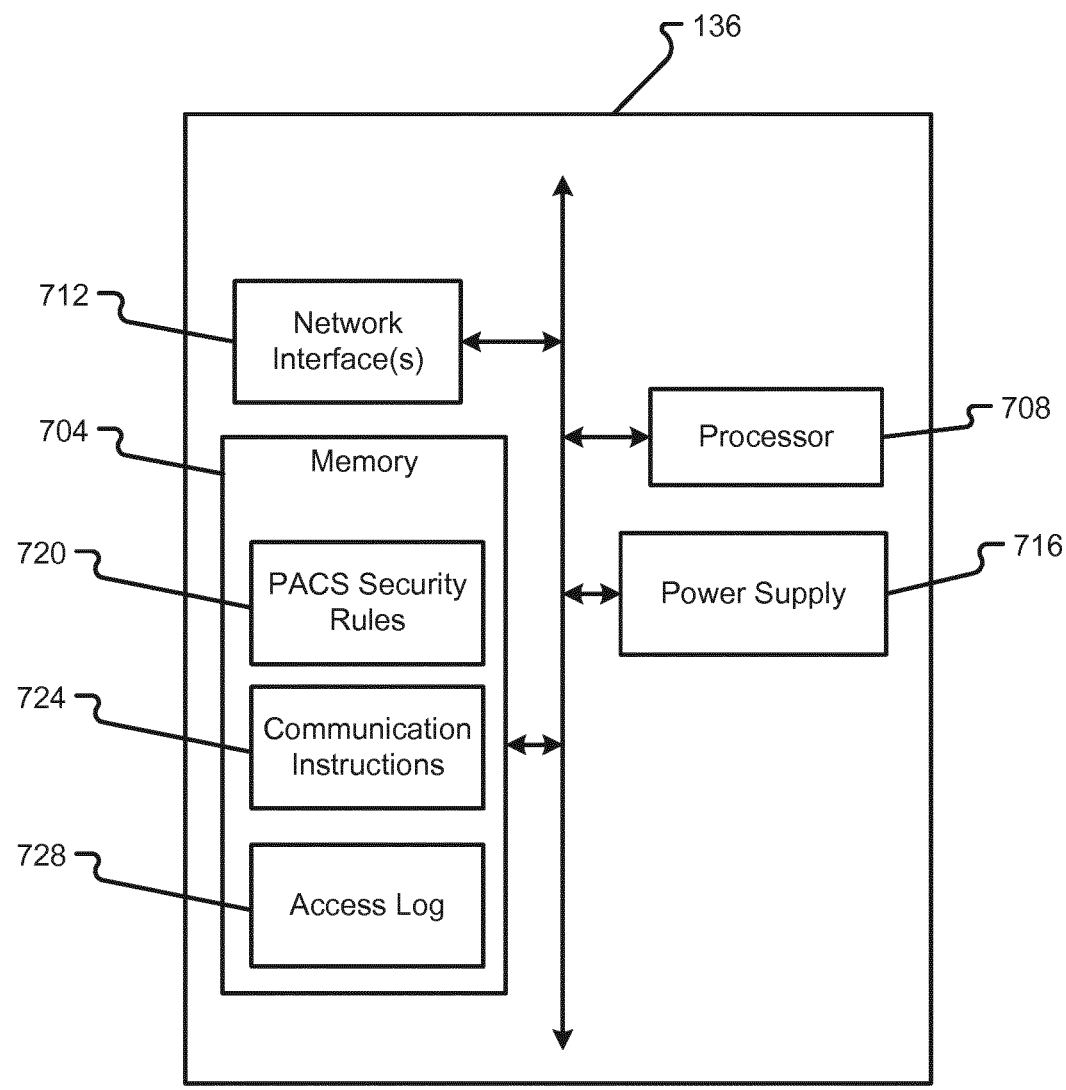
FIG. 7 is a block diagram depicting an access control server in accordance with at least some embodiments of the present disclosure.

With reference now to FIG. 7, additional details of an access control server 136 will be described in accordance with at least some embodiments of the present disclosure. The server 136 is shown to include memory 704, a processor 708, one or more network interfaces 712, and a power supply 716. The memory 704 may be similar or identical to memory 604. Likewise, the processor 708 may be similar or identical to processor 608. The power supply 716 may be similar or identical to power supply 616.

The network interface(s) 712 may be similar to network interface(s) 612, with some possible differences. For instance, the network interface(s) 712 may be designed to facilitate IP-based communications with the server 128. The network interface(s) 712 may also be designed to facilitate communications or the transmission of commands to the various components of the access control system 100. Specifically, the network interface(s) 712 may be designed to include an RS-232 port, an RS-485 port, a Wiegand communication interface, or the like.

The instructions stored in memory 704 may be configured to enable functionality of the access control server 136. In some embodiments, the instructions stored in memory 704 may include, without limitation, security rules 720, a communication instruction set 724, and an access log 728. Of course, the security rules 720 and/or access log 728 may be maintained external to the server 136, possibly within a database or the like.

The security rules 720 may include one or more access control tables, white lists, black lists, positive access permissions, negative access permissions, or algorithms which may be applied to determine whether a user 112 and/or a holder of a mobile device 104 is allowed to access a protected asset within the access control system 100. In some embodiments, the security rules 720 may include a listing of doors 116 within a secured property, associated door IDs, and associated tags 108 that are positioned on or near the door 116. The security rules 720 may also include permissions associated with each door 116, permissions associated with each tag 108, or combinations thereof. Alternatively or additionally, the security rules 720 may include a list of mobile devices 104 that are allowed to access a particular door 116 (or similar protected asset) in the event that the mobile device 104 proves a valid and unique interaction with a tag 108 that is positioned on or near the door 116.

The communication instruction set 724 may be similar to the communication instruction set 628 in that the communication instruction set 724, when executed by the processor 708, may enable the server 136 to communicate with the trusted tag server 128. Alternatively or additionally, the communication instruction set 724 may enable the access control server 136 to interact with and communicate commands to various locks 120 in the access control system 100.

The access log 728 may contain a listing of access control events that occur within the access control system 100. In some embodiments, the access log 728 may be used to store historical information related to successful and/or unsuccessful access attempts made by mobile devices 104 or users 112. Such access attempts, whether successful or unsuccessful, may include a listing of the door 116 associated with the attempt, a time of the attempt, and a result of the attempt (e.g., successful or unsuccessful). If a successful attempt is stored in the log 708, then the successful attempt may also be logged with the TAC and/or TAGID that was used/analyzed at the trusted tag server 128 in connection with the successful attempt.

Figure 8:
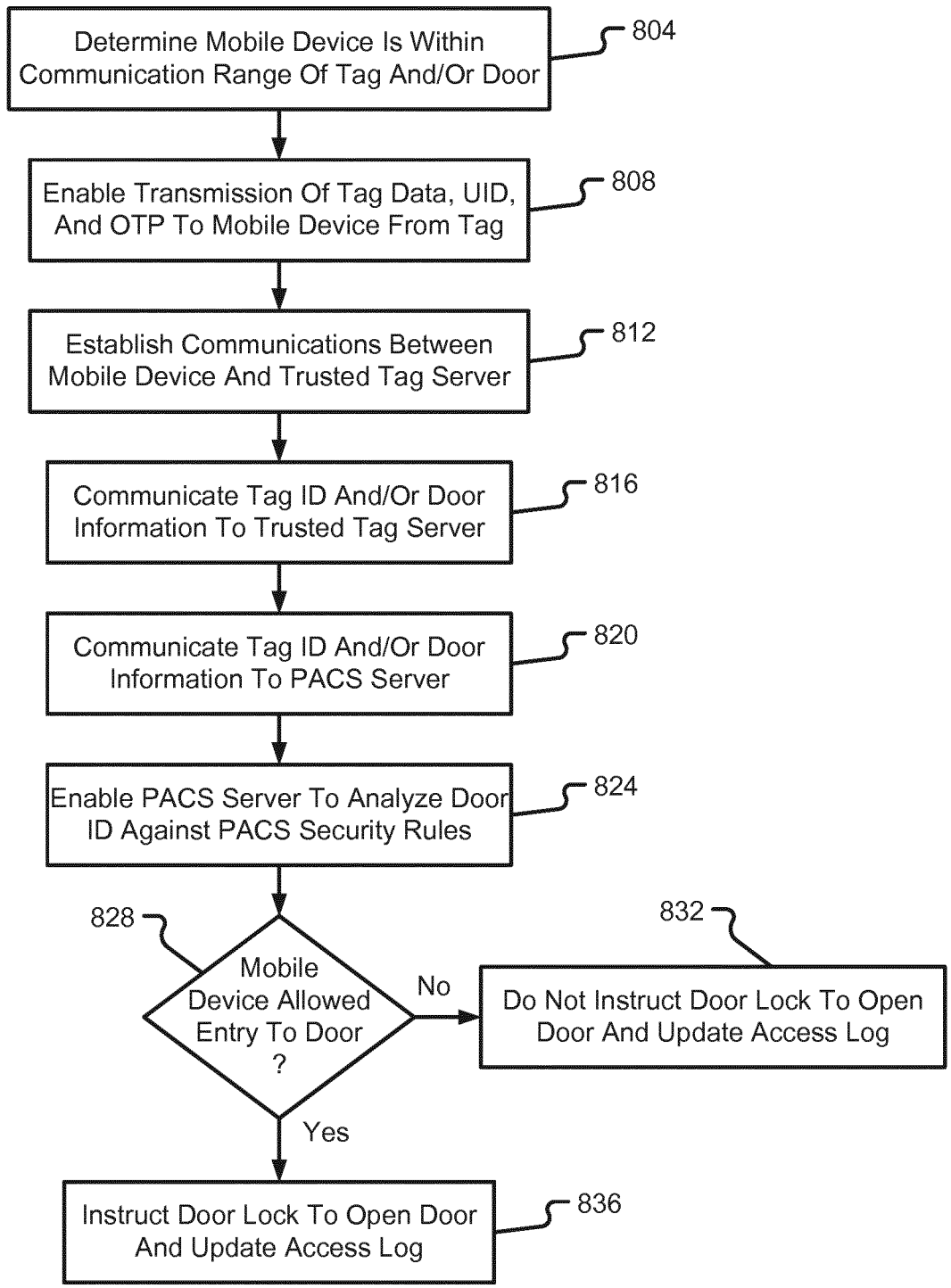
FIG. 8 is a flow diagram depicting an access control method in accordance with at least some embodiments of the present disclosure.

With reference now to FIG. 8, another access control method will be described in accordance with at least some embodiments of the present disclosure. The method begins when it is determined that a mobile device 104 has been brought within a communication range of a tag 108 and/or associated door 116 (step 804). In some embodiments, this particular step may occur automatically when the mobile device 104 is placed within an active read range of the tag 108 and the tag/mobile device recognize each other's proximity to one another.

The method may continue by enabling the tag 108 to transmit a payload of data to the mobile device 104 (step 808). In some embodiments, this first interaction between the mobile device 104 and tag 108 may result in the tag 108 transmitting its tag data, its UID, and an OTP to the mobile device 104. As discussed herein, the tag 108 may also include door information in the communication to the mobile device 104. In some embodiments, the tag 108 may generate one or more packet-based communications that are transmitted via Bluetooth or BLE. In some embodiments, the tag 108 may transmit one or more NDEF records to the mobile device 104, where the NDEF records contain the tag information, door information, etc. Part of the tag data transmitted to the mobile device 104 may include a website or web address that resolves to the trusted tag server 128. In some embodiments, the mobile device 104 is enabled to establish a communication session with the trusted tag server 128 by pointing its browser application to the web address defined in the data received from the tag 108 (step 812).

Once the mobile device 104 has established a communication session with the trusted tag server 128, the mobile device 104 may transmit the tag information (e.g., UID, TAGID, TAC, etc.) and/or door information (e.g., the door ID) to the trusted tag server 128 (step 816). The trusted tag server 128 may analyze at least some of the data received from the mobile device 104 to determine if the mobile device 104 recently had a unique interaction with the tag 108. The trusted tag server 128 may also be configured to determine whether the tag 108 corresponds to a trusted/valid tag by analyzing the UID and/or TAGID. If the analysis is successful at the trusted tag server 128, the method continues with the trusted tag server 128 communicating the tag information and/or door information to the access control server 136 (step 820). It should also be appreciated that the mobile device 104 may provide at least some of its information (e.g., a mobile device ID, self-determined location information, etc.) to the trusted tag server 128.

The access control server 136 may then reference the security rules 720 to determine whether the mobile device 104 or the user 112 of the mobile device 104 is permitted access to the protected asset (steps 824, 828). In some embodiments, the access control server 136 may cross reference the mobile device ID against the door ID and the security rules 720 to determine if the mobile device 104 is allowed access to the door associated with the door ID. Alternatively or additionally, the access control server 136 may be configured to analyze timestamp information, location information, and whether the tag 108 is still within a predetermined distance of the door 116 before determining whether the mobile device 104 is allowed to access the door 116.

If the query of step 828 is answered negatively, then the method may continue with the access control server 136 updating is access log 728 to indicate the failed access attempt (step 832). In this step, the access control server 136 may not send an unlock or open message to the door lock 120, but rather may not perform any communications with the door lock 120. Alternatively, the access control server 136 may transmit a message to the door lock 120 indicating that the door lock 120 should remain locked and the door 116 should remain secure for at least a predetermined amount of time. Such an action may be taken after a predetermined number of access attempts have occurred within a predetermined period of time or if the mobile device 104 is identified as a "threat" or "blacklisted" device, thereby necessitating additional security measures beyond simply keeping the door 116 closed and locked.

If the query of step 828 is answered positively, then the method may continue with the access control server 136 updating is access log 728 to indicate the successful access attempt and transmitting an appropriate command message to the door lock 120 (step 836). In some embodiments, the access log 728 may be updated with a time of the successful access attempt, an associated mobile device ID, the associated door ID, and any other information pertinent to maintaining an accurate record of access history for the door 116.

It should be appreciated that the various methods depicted and described herein may be used in connection with authentication or other verification processes. For example, embodiments of the present disclosure are not necessarily limited to authentication processes, but rather may be used to ask for a user's non-reputable consent or approval for an action. For instance, a user may be asked to confit in, consent, or approve a financial transaction or similar type of activity that occurs at a remote server.

It should be appreciated that any combination of authentication processes depicted and described herein can be performed without departing from the scope of the present disclosure. Alternatively or additionally, any number of other authentication processes can be developed by combining various portions or sub-steps of the described authentication processes without departing from the scope of the present disclosure.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

What is claimed is:

1. An access control system, comprising:
   a trusted tag server, comprising:
   a processor;
   a communication interface coupled with the processor and facilitating machine-to-machine communications; and
   computer memory coupled with the processor, wherein the computer memory comprises instructions that, when executed by the processor, enable the processor to:

receive tag information and door information from a mobile device as a result of the mobile device participating in a proximity-based communication with a tag;

analyze the tag information received from the mobile device;

determine, based on the analysis of the tag information, that the mobile device participated in a unique interaction with the tag as opposed to the tag information being part of a replay attack; and in response to determining that the mobile device participated in the unique interaction with the tag, transmit the door information to an access control server, physically separated from the trusted tag server by at least one communication network, wherein the door information transmitted to the access control server enables the access control server to make an access control decision for a protected asset with respect to the mobile device.

2. The access control system of claim 1, further comprising:

a door lock that is actuated in response to commands received from the access control server, wherein the door lock controls access to the protected asset by locking or unlocking a door.

3. The access control system of claim 2, wherein the tag is positioned on or near the door and wherein the door information comprises a unique identifier assigned to the door.

4. The access control system of claim 1, wherein the instructions further enable the processor to:

transmit a mobile device identifier to the access control server for comparison against a set of permitted or non-permitted mobile devices associated with the door information.

5. The access control system of claim 1, wherein the tag information comprises a tag authentication cryptogram (TAC) and a tag unique identifier (TAGID) that are appended to a resource locator.

6. The access control system of claim 5, wherein the resource locator comprises a web address that resolves to the trusted tag server and wherein the instructions further enable the processor to:

compare the TAC with previously-received TACs to ensure that the TAC received from the mobile device is unique and not matching any previously-received TACs.

7. The access control system of claim 2, wherein the access control server transmits an open command directly to the door lock that causes the door lock to release the door from a secure state.

8. The access control system of claim 1, wherein the door information transmitted to the access control system is accompanied by a timestamp, wherein the timestamp is generated by a processor of the mobile device or a processor of the tag to indicate a time of the interaction between the tag and mobile device.

9. An access control method, comprising:

receiving, at a trusted tag server, tag information and door information from a mobile device as a result of the mobile device participating in a proximity-based communication with a tag, wherein the tag is positioned on or near a protected physical asset;

analyzing, at the trusted tag server, the tag information received from the mobile device;

determining, by the trusted tag server, based on the analysis of the tag information, that the mobile device participated in a unique interaction with the tag as opposed to the tag information being part of a replay attack; and in response to determining that the mobile device participated in the unique interaction with the tag, transmitting the door information along with an identifier of the mobile device from the trusted tag server to an access control server, physically separated from the trusted tag server by at least one communication network, wherein the door information and the identifier of the mobile device transmitted to the access control server enables the access control server to make an access control decision for the protected physical asset with respect to the mobile device.

10. The method of claim 9, further comprising:

transmitting timestamp information to the access control server along with the door information and the identifier of the mobile device.

11. The method of claim 10, wherein the timestamp information is generated by a processor of the tag or by a processor of the mobile device.

12. The method of claim 9, wherein the tag information and door information received from the mobile device is encrypted, the method further comprising:

decrypting one or more data packets received from the mobile device using a decryption key;

extracting the tag information and the door information from the decrypted one or more data packets; and comparing the tag information against previously-received tag information to ensure that the interaction between the tag and the mobile device corresponds to the unique interaction.

13. The method of claim 9, wherein the tag information and door information are appended to a web address that resolves to a web server.

14. The method of claim 9, wherein the tag information comprises a tag authentication cryptogram (TAC) and a tag unique identifier (TAGID) that are appended to a resource locator and wherein the door information is appended to the resource locator but separated from the TAC and TAGID with at least one delimiter.

15. A server, comprising:

a processor;

a communication interface coupled with the processor and facilitating machine-to-machine communications; and computer memory coupled with the processor, wherein the computer memory comprises a plurality of instructions sets that are executable by the processor, wherein the plurality of instruction sets comprise:

a device authentication instruction set that is configured to perform an authentication process with a mobile device in response to the mobile device resolving a web browser to an address associated with the server;

a trusted tag analysis instruction set that is configured to receive tag information and door information from the mobile device, analyze the tag information, and then determine whether the mobile device participated in a unique interaction with the tag as opposed to the tag information being part of a replay attack, wherein the tag is positioned on or near a protected physical asset; and a communication instruction set that is configured to transmit the door information to an access control server, physically separated from the server by at least one communication network, in response to the trusted tag analysis instruction set determining that the mobile device participated in the unique interaction with the tag.

16. The server of claim 15, wherein the device authentication instruction set is configured to perform a mutual authentication with the mobile device using a web-based communication protocol.

17. The server of claim 16, wherein the trusted tag analysis instruction set is configured to parse a communication received from the mobile device and extract a tag authentication cryptogram (TAC) and a tag unique identifier (TAGID) that were appended to a resource locator and separated from one another with at least one delimiter.

18. The server of claim 15, wherein access to the physical asset is based on the mobile device interaction with the tag.

19. The server of claim 18, wherein the door information comprises a door identifier as well as a timestamp generated by a processor of the tag or mobile device.

20. The server of claim 15, wherein the device authentication instruction set comprises a decryption key that is used to decrypt communications received from the mobile device, wherein the decryption key belongs to a key pair with an encryption key maintained by the mobile device.

\* \* \* \* \*